United States Patent Office 3,585,186
Patented June 15, 1971

3,585,186
PREPARATION OF GLYCOPYRANOSIDURONIDES AND GLYCOPYRANOSIDES AND PRODUCTS RESULTING THEREFROM
Ransom Brown Conrow, Pearl River, and Seymour Bernstein, New City, N.Y., assignors to American Cyanamid Company, Stamford, Conn.
No Drawing. Filed Jan. 31, 1969, Ser. No. 795,699
Int. Cl. C07c 173/00
U.S. Cl. 260—210.5                 10 Claims

ABSTRACT OF THE DISCLOSURE

An improved method of preparing steroid glycopyranosiduronides and glycopyranosides is described. These compounds are prepared by reacting a glycosidyl or glycuronyl halide with an aromatic hydroxy steroid in the presence of a cadmium compound and a hydrocarbon solvent. The products are useful as estrogenic agents.

SUMMARY OF THE INVENTION

This invention relates to an improved method of preparing steroid glycopyranosiduronides and glycopyranosides.

In carrying out the process of the present invention, a glycosidyl or glycuronyl halide is reacted with an aromatic hydroxy steroid in the presence of a catalyst and solvent. The halides useful in the process of this invention may be either in the C–1 α- or β-form, for example, as follows:

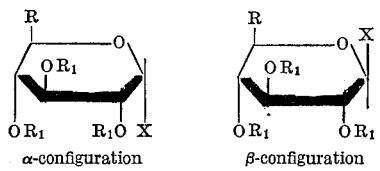

α-configuration   β-configuration wherein R is lower alkanoyloxy methyl, benzyloxymethyl, benzoyloxymethyl, or lower alkoxycarbonyl; $R_1$ is lower alkanoyl, benzyl or benzoyl and X is chlorine, bromine or iodine. Moreover the sugar itself may be either in the L or D series as determined by the configuration of the hydroxyl group at the penultimate carbon position.

The glycosidyl and glycuronyl halides useful in the present process are extensively described in the chemical literature [for example, L. G. Haynes and F. H. Newth, Advanced Carbohydrate Chemistry 10, 207 (1955)] and may be, for example, methyl 2,3,4-tri-O-acetyl-1-iodo-1-deoxy-α-D-glucopyranuronate;
methyl 2,3,4-tri-O-acetyl-1-bromo-1-deoxy-α-D-glucopyranose,
methyl 2,3,4-tri-O-acetyl-1-chloro-1-deoxy-α-D-glucopyranuronate;
methyl 2,3,4-tri-O-acetyl-1-bromo-1-deoxy-α-D-galactopyranuronate;
methyl 2,3,4-tri-O-acetyl-1-bromo-1-deoxy-α-D-mannopyranuronate,
2,3,4,6-tetra-O-acetyl-1-bromo-1-deoxy-α-D-glucopyranose,
benzyl-2,3,4-tri-O-benzyl-1-chloro-1-deoxy-β-D-glucopyranuronate,
6-O-benzoyl-2,3,4-tri-O-acetyl-1-bromo-1-deoxy-α-D-glucopyranose,
2,3,4,6-tetra-O-benzoyl-1-bromo-1-deoxy-α-D-mannopyranose,
2,3,4,6-tetra-O-acetyl-1-bromo-1-deoxy-α-L-glucopyranoside, and the like.

The hydroxysteroids useful in the process of the present invention are those having an aromatic A ring with a hydroxyl group in the 3-position. The steroids may have one or two double bonds in the steroid B ring. Among these steroids are, for example, estrone, 17β-estradiol-17-formate, estriol-16,17-diformate, equilin, equilenin and the like.

The catalyst useful in carrying out the reaction is any compound of cadmium which can neutralize the hydrogen halide formed in the process to produce the corresponding cadmium halide. The cadmium compounds include cadmium carbonate, cadmium hydroxide, cadmium acetate, cadmium cyanide, etc. The preferred catalyst is cadmium carbonate.

The reaction is carried out in a hydrocarbon solvent such as toluene, benzene, xylene, etc. The reaction is carried out at a temperature within the range of about 60° C. to 150° C. and is usually complete in a period of from 20 minutes to 3 hours. The sugar-steroid obtained is a mixture of alpha and beta anomers, with the beta isomer usually predominating.

The general reaction of the present invention can be illustrated as follows:

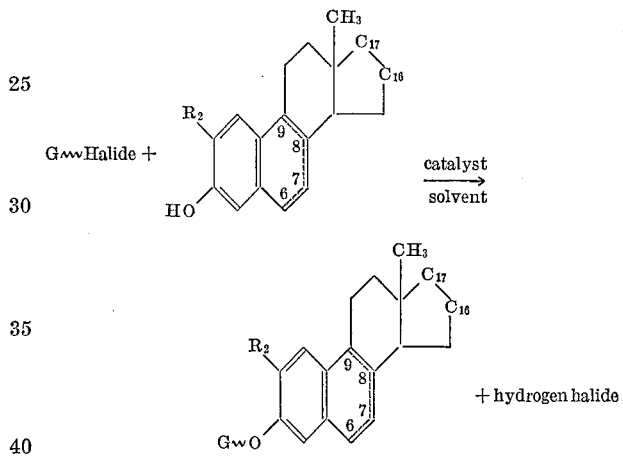

wherein G is a glycosidyl or glycuronsidyl group, $R_2$ is selected from the group consisting of hydrogen and methoxy; $-C_{17}-C_{16}$ is $-CO-CH_2-$, $-CHOCHO-CH_2$ or $-CHOCHO-CHOCHO-$; the dotted line is a single or double bond with the proviso that the double bond when present is in the (7–8) or (6–7, 8–9) positions.

The various glycosidyl and glycuronosidyl steroids prepared by the process are in the pyranose form and may be either in the C-1-α- or β-forms, for example, as follows:

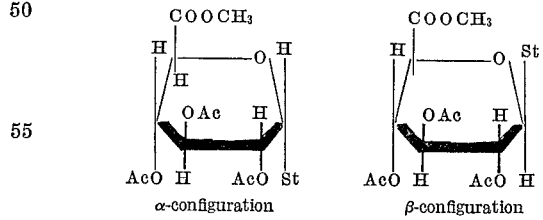

α-configuration   β-configuration wherein St represents the steroidal moiety described above, and Ac represents, for example, an acetyl grouping.

PREFERRED PROCEDURE OF THE INVENTION

In carrying out the invention, approximately 2 moles of the halosugar and 1 mole of the hydroxysteroid are reacted in the presence of a molar excess of cadmium catalyst. The reaction is carried out along the lines described by Meystre and Miescher, Helv. Chim. Acta., 27, 231 (1944). The reaction is carried out in a solvent, preferably toluene. As the halosugar in toluene solution is added to the reaction an equal volume of solvent is distilled from the reaction mixture. After the addition of the halosugar is complete, solvent is added slowly and an equal volume distilled during an additional 30 minutes. The mixture is filtered, solvent evaporated, and the residue dissolved in dimethylformamide and poured into water. The crude product is removed by filtration and the major by-product (sugar derivative) remains in the aqueous-dimethylformamide filtrate. Following the above reaction, a yield of 70% to 75% of the steroidal-sugar conjugate is obtained. This represents a tenfold improvement in yield over previously reported methods [Elce et al., J. Chem. Soc. (C), 542 (1967)]. This is an unobvious and unexpected result. Furthermore, the product is recovered in high purity by two or three crystallizations from methylene chloride-ethanol solutions. This avoids the more complicated and costly procedures such as chromatography which are often required by other methods.

The steroidal glucuronide sugars of the present invention can be hydrolyzed to the corresponding sodium salts for example, steroidal methyl-O-acetyl glycopyranosiduronates can be hydrolyzed to steroidal sodium glycopyranosiduronates by methods such as Conchie et al., Advanced Carbohydrate Chemistry 12, 157 (1957). Similarly the steroidal glycosidal sugars can be hydrolyzed to the free steroidal glycosides.

The steroid glucuronides and glycosides of the present invention are useful as estrogenic agents and are particularly useful in estrogen replacement therapy.

DETAILED DESCRIPTION

The following examples describe in detail the improved method of preparing steroidal sugars of this invention.

Examples 1.—Preparation of methyl [17-oxoestra-1,3,5 (10) - trien - 3 - yl - 2',3',4' - tri-O-acetyl-β-D-glucopyranosid]uronate (A) From tetra - o - acetylglucuronosyl bromide.—All equipment and reagents are thoroughly dried before use. A mixture of estrone [1.35 g. (5.0 millimoles)] cadmium carbonate [1.72 g. (10.0 millimoles)] and 100 ml. of toluene is boiled until 25 ml. of toluene distills off. A solution of methyl 2,3,4-tri-o-acetyl-1-bromo-1-deoxy-β-D-glucopyranuronate [3.97 g. (10.0 millimoles)] in 100 ml. of toluene is added dropwise to the stirred mixture over 1 hour during which time, an equal volume of toluene is distilled from the flask. The mixture is boiled for a further 0.5 hour during which 50 ml. of toluene is added and simultaneously distilled. The pink mixture is filtered through a pad of diatomaceous earth and the filtrate is evaporated to give a pasty yellow solid. The solid is dissolved in 50 ml. of dimethylformamide, and the solution poured into 200 ml. of water. The resulting mixtuer is filtered through a pad of diatomaceous earth and the product is washed on the filter with water and dissolved, in methylene chloride. The methylene chloride solution is dried over anhydrous sodium sulfate and evaporated under reduced pressure to give 3.15 g. of crude product. The crude product is crystallized twice from methylene chloride-ethanol to give 2.16 g. (74%) of colorless crystals. Material of analytical purity is obtained as follows. The product is crystallized again from methylene chloride-ethanol. A sample of this material is purified by thin layer chromatography on silica gel using 5% acetone-benzene as the developing solvent. The plates are developed twice and the product isolated in the usual way. The product is crystallized twice from methylene chloride-ethanol to provide colorless crystals melting point 230–233° C., $[\alpha]_D^{25}+55°$ (in CHCl$_3$).

(B) From teta O - acetyl glucuronosyl chloride.—Estrone is reacted with methyl 2,3,4-tri-O-acetyl-1-chloro-1-deoxy-α-D-glucopyranuronate using the same procedure outlined in paragraph A above but on ⅕ the scale. The initial reaction mixture is filtered through diatomaceous earth and evaporated to give a brown solid. The solid is dissolved in methylene chloride and ¼ the solution is evaporated and purified by thin layer chromatography as in preparation A above. A single crystallization of the resulting product from methylene chloride-ethanol gives 110 mg. (75%) colorless crystals, melting point 227–230° C.

Example 2.—Preparation of sodium [17-oxoestra-1,3,5 (10)-trien-3-yl-B-D-glucopyranosid]uronate To a suspension of 1.17 g. (2.0 millimoles) of methyl [17-oxoestra-1,3,5(10)-3-yl-2',3',4' - tri - O - acetyl-β-D-gluopyranosid]uronate prepared in Example 1, in 30 ml. of absolute methanol is added 2.0 ml. (10.0 millimoles) of aqueous 5 N sodium hydroxide solution. The mixture is stirred at room temperature for 1 hour, and then is co-evaporated under reduced pressure wtih ethanol until most of the methanol is removed. The mixture is filtered, the product washed with a small amount of absolute ethanol and dried at room temperature under reduced pressure to give 945 mg. of off-white solid. The product is crystallized from 90% aqueous ethanol to provide 635 mg. (64%) colorless plates. Material of analytical purity is obtained by an additional crystallization from 90% ethanol to give product with decomposition range of 287°–297° C. and $[\alpha]_D^{25}+26°$ (in H$_2$O).

Example 3.—Preparation of methyl [17β - formyloxyestra-1,3,5(10)-trien-3-yl - 2',3',4' - tri - O - acetyl-β-D-glucopyranosid]uronate A mixture of 4.0 g. (14.7 millimoles) of estra1,3,5-(10)-trien-3,17β-diol and 60 ml. of 88% formic acid is heated on the steam bath for 2 hours. The solution is evaporated under reduced pressure to give a gum which is dissolved in the minimum amount of methylene chloride and filtered through a bed of hydrous magnesium silicate using sufficient additional methylene chloride to elute the steroid. The filtrate is evaporated to a small volume and crystallized from hexane. An additional crystallization from methylene chloride-hexane provides 3.3 g. (75%) of 17β-formyloxyestra - 1,3,5(10) - trien-3-ol, colorless crystals, melting point 155°–157° C.

In the same manner as in Example 1(A), estradiol-17β-formate (1.50 g. 5.0 millimoles) is reacted with o-acetyl-glucuronosyl bromide to give 2.44 g. (79%) colorless crystals. Analytical material is obtained as follows. The product is crystallized again from methylene chloride ethanol and the resulting material is dissolved in methylene chloride and filtered through hydrous magnesium silicate (24 g.) which is then eluted with 300 ml. of methylene chloride. The filtrate is evaporated under reduced pressure, and the residue is crystallized twice from methylene chloride-ethanol to give colorless crystals, melting point 260–263° C., $[\alpha]_D^{25}$ +0° (in CHCl$_3$).

Example 4.—Preparation of sodium [17β-hydroxyestra-1,3,5(10)-trien-3-yl-β-D-glucopyranosid]uronate The product from Example 3, 1.23 g. (2.0 millimoles) is stirred with 60 ml. of absolute methanol and 2.8 ml. (4.0 millimoles) of 5 N aqueous sodium hydroxide for 1 hour at room temperature. The mixture is evaporated several times with ethanol until most of the material is removed. The mixture is filtered and washed with a small amount of ethanol to give 845 mg. colorless powder. The product is crystallized from aqueous acetone to give 666 mg. colorless crystals, and a second crop of 130 mg. The yield is therefore 796 mg. (76%).

Analytical material is obtained by an additional crystallization of the first crop from aqueous acetone to give colorless plates decomposing at 271°–280° C., des. $[\alpha]_D^{25}$ −130° (in H$_2$O).

Example 5.—Preparation of methyl [16α,17β-diformyloxyestra-1,3,5(10)-trien-3-yl-2',3'-4'-tri-O-acetyl - β-D-glucopyranosid]uronate A mixture of 2.0 g. (6.94 millimoles) of estra-1,3,5-(10)-trien-3,16α,17β-triol, 40 ml. of 88% formic acid and 200 mg. of p-toluenesulfonic acid monohydrate is heated on a steam bath for 15 minutes and is then allowed to remain at room temperature overnight. Pyridine (0.5 ml.) is added to the solution and the reaction mixture is poured into water and the solid is removed by filtration. The solid is dissolved in the minimal amount of methylene chloride and the solution is passed through a pad of hydrous magnesium silicate with sufficient additional methylene chloride to remove all of the steroid. Evaporation of the methylene chloride gives a solid which is crystallized twice from acetone-hexane to provide 1.75 g. (73%) of colorless crystals of 16α,17β-diformyloxyestra-1,3,5(10)-trien-3-ol, melting point 182–183° C.

Using the procedure described in Example 1(A), but on ½ the scale, esteriol 16,17-diformate prepared above, 861 mg. (2.5 millimoles) is reacted with O-acetylglucuronosyl bromide to give 1.10 g. (66.5%) of off white crystals, melting point 216°–223° C. The analytical sample is obtained as follows. The product is crystallized twice more from methylene chloride-ethanol then dissolved in methylene chloride and filtered through a bed of hydrous magnesium silicate. The filtrate is evaporated to dryness under reduced pressure and the product crystallized from methylene chloride-ethanol to provide colorless needles, melting point 225°–233° C. $[\alpha]_D^{25}$ —34° (in $CHCl_3$).

Example 6.—Preparation of sodium [16α,17β-dihydroxyestra-1,3,5(10)-trien-3-yl-β-D-glucopyranosid]uronate The product prepared in Example 5, 660 mg. (1.0 millimoles) is stirred with 30 ml. of absolute ethanol and 1.4 ml. (7.0 millimoles) of 5 N aqueous sodium hydroxide for 1 hour at room temperature. The mixture is filtered and the product is washed on the filter with ethanol followed by ether to give 539 mg. of colorless solid. The product is crystallized from aqueous ethanol to give 339 mg. (63%) colorless needles decomposing at 265°–275° C. The analytical sample is obtained by an additional crystallization from aqueous ethanol to give colorless needles decomposing at 270°–280° C. $[\alpha]_D^{25}$ —23° (in $H_2O$).

Example 7.—Preparation of methyl [2-methoxy-17-oxoestra-1,3,5(10)-trien-3-yl-2',3',4'-tri-O - acetyl - β-D-glucopyranosid]uronate Following the experimental details of Example 1(A) in which 2-methoxyestrone is used as the steroid, the product of the example is obtained.

Example 8.—Preparation of methyl [17-oxoestra-1,3,5(10)-7-tetraen-3-yl-2',3',4'-tri-O-acetyl - β - D-glucopyranosid]uronate Following the procedure described in Example 1(A) and using quilin as the steroid, the product of the example is obtained.

Example 9.—Preparation of methyl [17-oxoestra-1,3,5(10)-6,8-pentaen-3-yl-2',3',4'-tri-O-acetyl - β - D-glucopyranosid]uronate When the experimental details of Example 1(A) are used an equilenin is substituted as the steroid, the product of the example is obtained.

Example 10.—Preparation of sodium [2-methoxy-17-oxoestra-1,3,5(10)-trien-3-yl-β-D-glucopyranosid]uronate The product of Example 7 on saponification with methanolic sodium hydroxide gives the product of the example.

Example 11.—Preparation of sodium [17-oxoestra-1,3,5(10)-trien-3-yl-β-D-glucopyranosid]uronate The product of Example 8 on saponification with methanolic sodium hydroxide gives the product of the example.

Example 12.—Preparation of sodium [17-oxoestra-1,3,5(10)-6,8-pentaen-3-yl-β-D-glucopyranosid]uronate The product of Example 9 on saponification with methanolic sodium hydroxide gives the product of the example.

Example 13.—Preparation of 17-oxoestra-1,3,5(10)-trien-3-yl-2',3',4',6'-tetra-O-acetyl-β-D-glucopyranoside and 17-oxoestra-1,3,5(10)-trien-3 - yl - 2',3',4',6'-tetra-O-acetyl-α-D-glucopyranoside

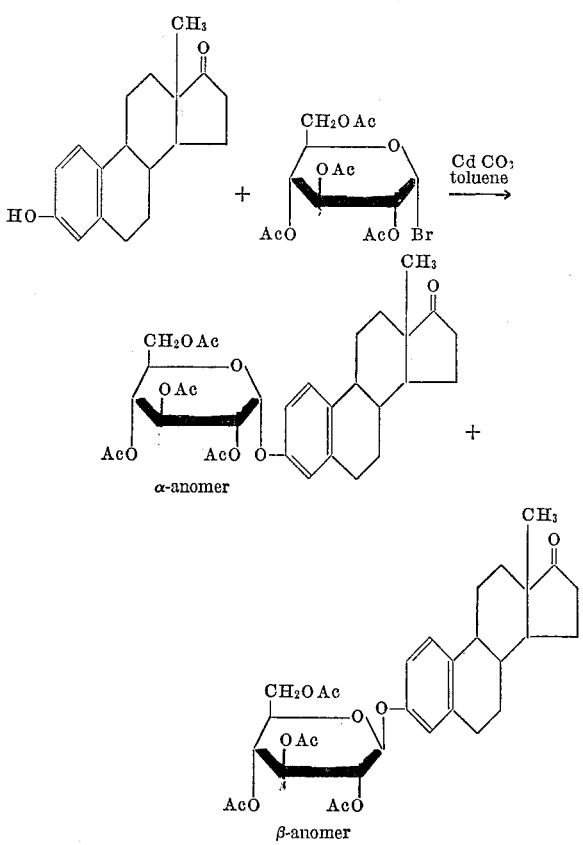

Using the procedure described in Example 1(A) estrone (1.35 g., 5.0 millimoles) is reacted with tetra-O-acetyl-1-bromo-1-deoxy-α-D-glucopyranoside (4.11 g., 10.0 millimoles) to give crude material which is crystallized from methylene chloride-ethanol solution. The resulting product is filtered through hydrous magnesium silicate (20 g.) in methylene chloride solution followed by 300 ml. of methylene chloride wash. The filtrate is evaporated to small volume and crystallized from ethanol to provide 1.54 g. (51%) to the β-pyranoside (or anomer) as colorless needles in analytical purity and melting point 214–217° C., $[\alpha]_D^{25}$ +65° C.

The mother liquors from the above crystallization are evaporated under reduced pressure and the residue is purified by partition chromatography on diactomaceous earth using the system heptane:chloroform:methanol:water 50:1:10:2.5 as eluate. The α-pyranoside (or anomer) is obtained first and is crystallized from ether-hexane to give 194 mg. (6.5%) of colorless needles melting point 95–100°. Material of analytical purity is obtained by an additional crystallization from hexane-ether followed by a final crystallization from isopropyl ether to provide colorless needles, melting point 133°–136° C.; $[\alpha]_D^{25}$ ($CHCl_3$) +203°.

The β-pyranoside is obtained next from the column and after crystallization from methylene chloride-ethanol, gives an additional 348 mg. giving a total yield of 63%.

We claim:
1. A method of preparing a glycosylsteroid of the formula:

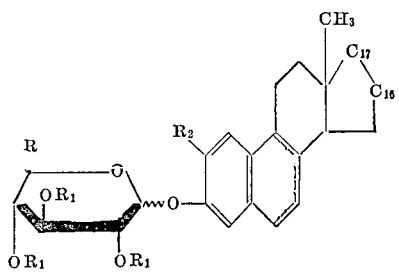

wherein R is selected from the group consisting of lower alkanoyloxy methyl, benzyloxymethyl, benzoyloxymethyl and lower alkoxycarbonyl; $R_1$ is selected from the group consisting of lower alkanoyl, benzyl and benzoyl; $R_2$ is selected from the group consisting of hydrogen and methoxy; —$C_{17}$—$C_{16}$— is selected from the group consisting of —CO—$CH_2$—, —CHOHO—$CH_2$— and —CHOHO—CHOHO—; the dotted line is a single or double bond with the proviso that the double bond when present is in the (7–8) or (6–7), (8–9) positions which comprises heating a steroid of the formula:

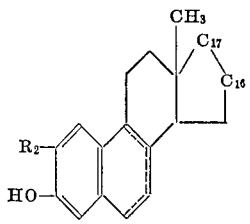

where $R_2$ and —$C_{17}$—$C_{16}$— are as defined above with an excess of a halide of the formula:

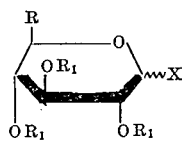

wherein R, and $R_1$ are as defined above and X is a halogen selected from the group consisting of chlorine, bromine and iodine, in the presence of an excess of a cadmium compound and a hydrocarbon solvent and recovering said compound on substantial completion of the reaction by removal of the solvent to produce the desired product.

2. A method in accordance with claim 1, wherein the product is treated with an alcoholic alkali metal hydroxide and recovered as the non-esterified alkali metal salt.

3. A method in accordance with claim 1, wherein the —$C_{17}$—$C_{16}$— group is —CHOHO—$CH_2$—.

4. A method in accordance with claim 1, wherein a steroid having the group —CHOHO—$CH_2$— is reacted with methyl - 2,3,4 - tri-O-acetyl-1-bromo-1-deoxy-$\beta$-D-glucepoyranuronate in the presence of cadmium carbonate.

5. A method of preparing 17-oxoestra-1,3,5(10)-trien-3-yl-2',3',4',6' - tetra - O - acetyl-alpha and beta D-glucopyranoside which comprises heating estrone with an excess of tetra-O-acetyl-1-bromo-1-deoxy-$\alpha$-D-glucopyranoside in the presence of an excess of cadmium carbonate in a hydrocarbon solvent, at a temperature of from about 60° C. to 150° C. for from about 20 minutes to 3 hours separating the precipitated beta anomer and recovering the alpha anomer from the filtrate by chromatography.

6. A compound of the formula:

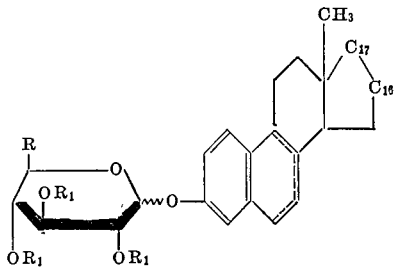

wherein R is lower alkoxycarbonyl, $R_1$ is lower alkanoyl, and —$C_{17}$—$C_{16}$ is selected from the group consisting of —CHOHO—$CH_2$— and —CHOHO—CHOHO; the dotted line is a single or double bond with the proviso that the double bond when present is in the (7–8) or (6–7, 8–9) positions.

7. The compound according to claim 6, methyl [17$\beta$-formyloxyestra-1,3,5(10)-trien-3-yl-2',3',4' - tri -O-acetyl-$\beta$-D-glucopyranosid]uronate.

8. The compound according to claim 6, methyl [16$\alpha$, 17$\beta$ - diformyloxyestra - 1,3,5(10)-trien-3-yl-2',3',4-tri-O-acetyl-$\beta$-D-glucopyranosid]uronate.

9. The compound, sodium [17-oxoestra-1,3,5(10),7-tetraen-3-yl-$\beta$-D-glucopyranosid]uronate.

10. The compound, sodium [17-oxoestra-1,3,5(10),6,8-pentaen-3-yl-$\beta$-D-glucopyranosid]uronate.

References Cited

UNITED STATES PATENTS 3,036,062  5/1962  MacPhillamy et al. __ 260—210.5
3,206,359  9/1965  Sarett et al. _____ 260—210.5

LEWIS GOTTS, Primary Examiner

J. R. BROWN, Assistant Examiner

U.S. Cl. X.R.
260—999

UNITED STATES PATENT OFFICE
CERTIFICATE OF CORRECTION

Patent No. 3,585,186          Dated June 15, 1971

Inventor(s) Ransom Brown Conrow and Seymour Bernstein

It is certified that error appears in the above-identified patent and that said Letters Patent are hereby corrected as shown below:

In Column 5, line 66, Example 11, please change the Example to read:

-- Preparation of Sodium [17-oxoestra-1,3,5(10)-7-tetraen-3-yl-β-D-glucopyranosid]uronate --

Signed and sealed this 9th day of November 1971.

(SEAL)
Attest:

EDWARD M. FLETCHER, JR.          ROBERT GOTTSCHALK
Attesting Officer                Acting Commissioner of Patents